United States Patent [19]

Kalafatas et al.

[11] 3,927,221

[45] Dec. 16, 1975

[54] COLD WATER-SOLUBLE GELATIN COMPOSITION AND PROCESS OF PREPARING SAME

[75] Inventors: Nicholas J. Kalafatas, Arlington; Harold Rosenthal, Newtonville; George A. Consolazio, Burlington, all of Mass.

[73] Assignee: General Foods Corporation, White Plains, N.Y.

[22] Filed: May 7, 1973

[21] Appl. No.: 358,204

[52] U.S. Cl................................. 426/576; 426/448
[51] Int. Cl.$^2$............................................ A23L 1/06
[58] Field of Search ........... 426/167, 168, 169, 350, 426/448

[56] References Cited

UNITED STATES PATENTS

| | | | |
|---|---|---|---|
| 2,949,428 | 8/1960 | Leo...................................... | 426/168 |
| 3,163,543 | 12/1964 | Gorfinckle.......................... | 426/350 |
| 3,341,334 | 9/1967 | Mitchell.............................. | 426/350 |
| 3,595,676 | 7/1971 | Langen et al....................... | 426/170 |

*Primary Examiner*—Jeanette M. Hunter
*Attorney, Agent, or Firm*—Bruno P. Struzzi; Thomas V. Sullivan

[57] ABSTRACT

A cold water-soluble gelatin composition is prepared by subjecting a sugar/gelatin admixture to heat and pressure while applying shearing forces to the admixture in a closed system.

10 Claims, No Drawings

COLD WATER-SOLUBLE GELATIN COMPOSITION AND PROCESS OF PREPARING SAME

This invention relates to a cold water-soluble gelatin composition and to a process of preparing the same.

Gelatin is a well-known article of commerce and is used in a wide variety of products wherein its gel-forming properties are desired. Typical of such uses is the use of gelatin in dessert mixes. In preparing a dessert from a gelatin-based mix, it is necessary to employ hot, i.e., 140° to 160°F., water to dissolve the gelatin and the other ingredients. The gelatin solution must then be cooled until it sets to a gel. Although refrigeration of the solution may shorten the time for gel formation it, nevertheless, usually takes several hours at refrigerator temperatures to cool the hot solution to temperatures at which gelation takes place.

It is apparent that a gelatin, more particularly, a gelatin composition, which requires hot water to dissolve it and requires extended periods of time for cooling the solution so formed, possesses inherent disadvantages. However, to the present, the desired objective of a cold water-soluble gelatin composition which would offer added convenience by allowing for the use of cold water for dissolving it and thereby effectively shortening its setting time, has not been fully realized. One of the techniques which has been proposed has been that of forming solutions of gelatin and large quantities of sugar and then drying the sugar/gelatin solutions using specialized drying methods. U.S. Pat. Nos. 2,803,548, 2,841,498 and 2,948,622 describe such a technique. These patents indicate the ratio of sugar to gelatin in the products should be at least of the order of 8:1 or higher; lower ratios not being thought to be suitable to give the desired rate of cold water-solubility of the gelatin. However, the cost of drying large volumes of sugar/gelatin solutions and the additional drying equipment needed for the drying operation make such technique disadvantageous.

It has now been discovered that a cold water-soluble gelatin composition may be prepared by admixing a sugar and gelatin, restricting the moisture level of the admixture to below 6 percent, and subjecting the admixture to heat and pressure while applying shearing forces to the admixture in a closed system. By application of this invention the need for elaborate or extensive drying systems is obviated.

While it is not desired to be bound by any particular theory, it appears that the treatment of the sugar/gelatin admixture according to the process of this invention converts the free-flowing granular material to a flux, thereby disorienting and/or spacing the molecules of the gelatin. As a result, the bonding forces between the molecules are weakened or destroyed.

Ordinarily, gelation bonds are present in conventionally dried gelatin since the gelatin is dried from a gel state and when the dried gelatin is dissolved in hot water, these bonding forces are only then weakened or destroyed. When conventionally dried gelatin is dispersed in cold water, the gelatin particles swell individually to form a gel. The particles may adhere to one another at the surface but these swollen particles do not form a continuous, homogeneous gel. By the novel process which has now been discovered, it seems as if the bonding forces of the gelatin are so weakened or destroyed that hot water is not needed to dissolve the gelatin but, instead, the gelatin composition becomes and is readily soluble in cold water. For purposes of the present invention, cold water-solubility means solubility in water having a temperature of from about 35° to about 70°F.

Additional preferred features of the present invention include adjusting the moisture content of the sugar/gelatin admixture to from about 2.5 percent to about 6 percent; controlling the moisture content of the final gelatin composition to a level below about 3 percent; grinding or otherwise subdividing the gelatin composition to a particle size such that 75 percent passes through a 100 mesh U.S. standard screen and not more than 30 percent passes through a 200 mesh U.S. standard screen; incorporating a dispersant into the admixture and/or the final composition; and agglomerating the composition to further improve dispersibility. While any of such preferred features may be employed as separate processing steps, all of them have been generally found to increase or improve dispersibility. On the other hand, the essential processing step, namely that of subjecting the sugar/gelatin admixture to heat and pressure while applying shearing forces to the admixture in a closed system results in cold water-solubility.

A preferred method for carrying out the process involves the use of extrusion apparatus such as is typically used in the plastics industry. Such apparatus is readily adapted to furnish heat and pressure which have to be applied to the admixture and to permit the admixture to be maintained within a confined system as it is subjected to the shearing forces which cause the molecules to slide over and against each other and become disoriented. The use of a confined system is considered essential so as to retain the plasticizer, typically water, which is both added and normally present in gelatin to the extent of 8 to 14 percent, and to keep the melt viscosity at the desired level.

The gelatin from which the cold water-soluble gelatin composition of this invention may be prepared according to the process of this invention may be of any type, e.g., Type A (acid precursor) or Type B (alkali precursor) gelatin or mixtures thereof, and may be of any Bloom, usually 150 to 275 Bloom.

The composition of this invention may be prepared using a wide range of sugar to gelatin ratios. Thus, the final composition may contain sugar in an amount of from about 4:1 to about 12:1, by weight, based upon the amount of gelatin. However, it has been found that at the various sugar/gelatin ratios, the moisture level of the sugar/gelatin admixture must be adjusted so as to provide a required degree of plasticity in the apparatus, typically an extruder, and to maintain the desired melt viscosity of the admixture as it is being processed. Nevertheless, dependent upon the type of extrusion apparatus employed, the length of the barrel, the capacity of the extruder, the die face opening, screw flight characteristics, etc., plasticization with added water or other materials may be readily determined and appropriate adjustment of sugar/gelatin ratios may be made. In any event, it has been discovered that it is essential to have water or moisture added to the admixture in carrying out the process so as to be able to plasticate the gelatin and to dissolve the sugar. It appears that with the added water, extrusion of the sugar/gelatin admixture is easily achieved. Generally, adding water in an amount such that the moisture content of the admixture is from about 2.5 to about 6 percent is sufficient.

While sugar, i.e., sucrose, is the preferred sugar in the cold water-soluble gelatin composition of this invention, other sugars such as dextrose, lactose, corn syrup solids and the like may be used alone or in combination with each other and with sucrose. Further, limited amounts of ingredients, such as starches and cereals, may be included in the sugar/gelatin admixture. However, in employing sugars other than sucrose and adding other edible materials, it is essential to maintain and control the plasticity of the gelatin and to retain the minimum melt viscosity of the admixture as it is being processed.

Since a typical use of the cold water-soluble gelatin composition is in gelatin-based dessert mixes, it has been found that certain ingredients of such mixes may also be incorporated into the admixture to be processed according to the process of this invention. Thus, acids, such as adipic, fumaric, citric, tartaric and the like, singly or in combination, may be blended with the admixture. It appears that the acid may aid in plasticating the admixture during extrusion. Also, buffers, such as citrates, phosphates and the like, may be incorporated into the admixture since, when an acid ingredient is present in the admixture, the buffer is of value in maintaining the pH and preventing degradation during extrusion. As mentioned, the acid and buffer ingredients are those which would ordinarily be included in gelatin-based dessert mixes and, thus, their inclusion in the admixture and, at the same time, the necessity for later addition when the final dessert mix is being made up may be avoided.

In order to illustrate the present invention, the following non-limiting examples are given:

EXAMPLE I

In a Hobart mixer, 85.5 parts of sugar and 12.2 parts of gelatin containing 10 percent moisture (200 Bloom, Type B) are blended to provide an admixture with a sugar/gelatin ratio of 7 to 1. The admixture is then moisturized to 3.5 percent by adding 2.3 parts water. The resulting admixture is then passed through a 1 inch extruder manufactured by National Rubber Machinery Corporation, Akron, Ohio, having a 1 inch barrel with a 24:1 length to diameter ratio and equipped with a 24 flight, constant pitch screw typically used for extruding polyethylene and a die orifice of 0.055 inch. The temperatures measured along the barrel are maintained at 220°F., 270°F. and 255°F. as measured at consecutive segments of the barrel along its length and the rate of feed is controlled so that the composition is extruded at a rate of 12 pounds per hour. Following extrusion, the composition in rod-like form is passed through a tube with cocurrent air so as to cool the composition. Following cooling from 250°F. to 120°F., the composition is dried to a moisture content of 0.75 to 1.25 percent and is then ground to particle size such that 98 percent passes through a 60 mesh U.S. standard screen.

The resulting composition is found to be soluble in 50°F. water after two minutes of spoon stirring.

In a control experiment, 85.5 parts of sugar and 12.2 parts of conventionally dried gelatin containing 10 percent moisture are merely dry blended and the resulting blend is mixed with 50°F. water. After five minutes of spoon stirring, the blend had not dissolved indicating that the blend was not cold water-soluble.

EXAMPLE II

A gelatin dessert is prepared using the following procedures:

To 25.32 parts of granulated sugar (sucrose), 0.3 parts of triacetin are added and these are mixed in a Hobart mixer at lowest speed. The remaining ingredients in any order are added as follows:

| | |
|---|---|
| Gelatin composition (as prepared in Example I) | 70 parts |
| Adipic Acid | 2.12 parts |
| Fumaric Acid | 0.67 parts |
| Trisodium Citrate | 0.99 parts |
| Polysorbate 60 | 0.60 parts |
| Flavor | q.s. parts |
| Color | q.s. parts |

The total mixture is then blended for ten minutes.

In using the thus prepared gelatin dessert mix in making a dessert gel, one pint of water at 50°F. is added to 3 ounces of gelatin dessert mix. Following stirring of the water and the mix for 2 minutes with a spoon, complete dissolution of mix is apparent and a clear solution is observed. On refrigeration, the solution sets within 2 hours to a clear continuous gel as compared to about 4 hours when hot water is used to dissolve a conventional gelatin dessert mix.

If desired, the composition resulting from extrusion of the sugar/gelatin admixtures processed according to this invention may be agglomerated following known procedures. The agglomerated product is noted to have slightly improved cold water solubility and better dispersibility.

Dispersants, wetting agents and emulsifiers may also be incorporated with the extruded sugar/gelatin admixture processed according to the invention. These materials, while not absolutely necessary, appear to enhance the dispersibility of the cold water-soluble composition of the invention. Also, conventional gelatin dessert ingredients, such as acids, buffers and the like, may be included in the sugar/gelatin admixture which is extruded. It has been found that under certain extrusion conditions and at certain sugar/gelatin ratios, the addition of such ingredients may further improve the cold water solubility of the resulting composition.

While the foregoing invention has been described in conjunction with certain preferred embodiments, it is to be understood that the invention is not to be restricted thereto but is to be construed broadly and to be limited only by the following appended claims.

What is claimed is:

1. A process of preparing a cold water-soluble gelatin composition which comprises admixing a sugar and gelatin, adjusting the moisture content of the admixture to from about 2.5 to about 6 percent by weight, subjecting the admixture to heat and pressure while applying shearing forces to the admixture in a closed system and extruding the admixture to obtain a cold water-soluble gelatin composition.

2. A process as in claim 1 further comprising drying the composition to a moisture content of less than about 2.5 percent.

3. A process as in claim 2 in which the weight ratio of sugar to gelatin is from about 4 to 1 to about 12 to 1.

4. A process as in claim 3 further comprising adding an edible acid and a buffer salt to the admixture.

5. A process as in claim 3 further comprising subdividing the composition to a particle size such that 75% passes through a 100 mesh U.S. standard screen and not more than 30% passes through a 200 mesh U.S. standard screen.

6. A process as in claim 5 further comprising agglomerating the composition.

7. A process as in claim 5 further comprising incorporating a dispersant into the composition.

8. A process as in claim 4 further comprising incorporating a dispersant into the admixture.

9. A cold water-soluble gelatin composition prepared by the process of claim 1.

10. A gelatin-based dessert mix comprising the cold water-soluble gelatin composition of claim 9.

* * * * *